INVENTOR
MAX KRAWITZ
BY
Norman J. O'Malley
ATTORNEY

INVENTOR
MAX KRAWITZ
BY
Norman J. O'Malley
ATTORNEY

INVENTOR
MAX KRAWITZ
BY
Norman J. O'Malley
ATTORNEY

May 17, 1960 M. KRAWITZ 2,936,682

DEVICE FOR USE IN PROCESSING DISCRETE SCREEN PATTERNS FOR CATHODE RAY TUBES

Filed July 2, 1956 9 Sheets-Sheet 4

INVENTOR
MAX KRAWITZ
BY
Norman J. O'Malley
ATTORNEY

May 17, 1960 M. KRAWITZ 2,936,682

DEVICE FOR USE IN PROCESSING DISCRETE SCREEN PATTERNS FOR CATHODE RAY TUBES

Filed July 2, 1956 9 Sheets-Sheet 5

INVENTOR
MAX KRAWITZ
BY
Norman J. O'Malley
ATTORNEY

INVENTOR
MAX KRAWITZ
BY
Norman J. O'Malley
ATTORNEY

INVENTOR
MAX KRAWITZ
BY
Norman J. O'Malley
ATTORNEY

INVENTOR
MAX KRAWITZ
BY
Norman J. O'Malley
ATTORNEY

INVENTOR
MAX KRAWITZ
BY
Norman J. O'Malley
ATTORNEY 2,936,682

DEVICE FOR USE IN PROCESSING DISCRETE SCREEN PATTERNS FOR CATHODE RAY TUBES

Max Krawitz, Seneca Falls, N.Y., assignor, by mesne assignments, to Sylvania Electric Products Inc., Wilmington, Del., a corporation of Delaware Application July 2, 1956, Serial No. 595,266

2 Claims. (Cl. 95—1)

This invention relates to image reproduction devices and more particularly to cathode ray tube structures adapted to be used in color television receiving apparatus, and to the method of making such devices.

Picture tubes employed as image reproduction devices in color television receivers generally have one or more electron guns for providing a source and the acceleration, focusing and modulation voltages for the electron beam or beams employed in the device. When more than one electron gun is utilized, convergence electrodes or pole pieces are generally also fabricated as part of the electron gun structure. These modulated electron beams are deflected across the screen to provide electron impingement upon selected ones of color fluorescing material configurations formed on the viewing panel of the tube to reproduce the transmitted color image. Conventionally, a grid or series of grids or a mask are interposed between the electron gun or guns and picture tube screen to provide deflection or focusing of the electron beam or masking of the screen.

The screen for a color picture tube is generally made with a very large number of dot, bar or stripe formations consisting of red, green and blue color fluorescent materials. The configuration of the fluorescent patterns constituting the screen are formed in accordance with the number of electron guns employed and with the configuration and operative characteristics of the grids or masks used in the picture tube.

Since a very large number of fluorescent material groups are needed to produce a pattern sufficient to provide a high resolution picture, the process of forming the fluorescent pattern must be one which is capable of accurately forming discrete configurations if color purity is to be realized. One preferred process utilizes a printing technique wherein the viewing panel, which has been coated with a light sensitive substance and the desired fluorescent material, is exposed to a point source of light through an appropriate negative master. The screen is subsequently developed to produce the first fluorescent pattern comprising, for instance, an array of blue fluorescent material configurations. This process is sequentially repeated with green and red fluorescent materials to complete the production of the tri-color screen. The point source of light is appropriately offset during the exposure operation to provide individual color emitting fluorescent material patterns which are displaced from one another to form a screen prescribed by the type of picture tube in which it is employed.

Although the photo-printing technique used in the art of producing the viewing screens for color picture tubes has enhanced the feasability of large scale production of these tubes, there is still much to be desired in the actual image reproduction characteristics of the tubes so produced. One difficulty encountered lies in the manufacturing inability to maintain the extremely rigid and narrow tolerances of the parts and assemblies dictated by the image reproduction device system within the tube itself. A second difficulty, and one of primary importance, is based upon the fact that electrons do not follow the same path during tube operation as the light rays travel during the screen processing procedures. Consequently, the electrons do not properly land on the fluorescent material configurations during tube operation, and an image having color impurity results. This occurrence is normally referred to by the term "misregistry."

The various contributing factors of misregistry recited above are inherent in any type of picture tube utilizing one or more electron beams to reproduce a hi-fidelity multi-color picture. For instance, due to the fact that many parts having different shapes and compositions must be assembled together and processed separately and in combination, sometimes at very high temperaures, actual physical deformations and misalignment of the parts will inherently occur. In addition, due to the charge and mass of the electrons projected towards the screen of the tube, the paths of travel of the electrons are altered by the tube geometry and, in some instances, by various electrostatic and magnetic symmetrical and unsymmetrical fields existing in and around the tube. For example, it has been discovered that the center of deflection (i.e., the location within the deflection yoke where the scanned electrons appear to come from) move as the electron beam is caused to scan the screen. Also, extraneous electron affecting fields such as the earth's magnetic field alters the paths of electron movement. When more than one gun is used, an additional phenomena resulting from dynamic convergence of the electron beams causes a departure of the beams from their otherwise expected paths of travel.

Numerous methods for reducing the amount of misregistry between the electron beam or beams and the fluorescent configurations have been proposed. For the most part, these methods include the use of auxiliary electrostatic or magnetic field producing devices employed internally or externally of the tube and on or about the tube parts to compensate for the excursion of the electron beam from the desired trajectory. In instances where a certain type of misregistry has been attributed to a specific phenomena, one or more of the tube components and its associated electron affecting devices have been physically positioned to have the beam follow a path which will produce a mean value of misregistry over the entire screen. This procedure is at best a compromise, and does not provide the solution for the problem of misregistry.

Since a printing technique has been found to be the most appropriate method of attaining the screen pattern desired to date, negative masters are required for the performance of this process. These masters must necessarily be fabricated with an extremely high degree of accuracy. Conventionally, either an electronic process or a drafted pattern photographic multiplying process is used to achieve the proper master configuration. The electronic method may use a cathode ray tube with fluorescent material on the tube face panel. This fluorescent screen is energized in accordance with a conventional scan pattern of one gun, or in some instances, a scan pattern of one gun having a selected electrical signal modulation imposed thereon. Optical means are provided outside and adjacent to said face panel to record the pattern on a photographic emulsion. Subsequent reproduction of a negative of this produced image on a metal or glass foundation, in some cases, followed by an etching operation, produces the negative master. Alternatively, a photographic emulsion may be deposited on the interior of the face panel and exposed directly by electron impingement, after which the panel is separated from the tube and photographic means are employed to make a master. If needed, this procedure is repeated with other guns or signal modulation pulses to produce an entire screen pattern.

The drafting method of forming a master adapted for use in the screen forming process commonly uses a small number of accurately drawn enlarged configurations multiplied in a series of demagnification and displaced photographic reproduction operations. This method and the electronic method are both cumbersome and expensive. The electronic method requires careful control over the scanning circuits and the surrounding magnetic and electrostatic fields in addition to requiring extreme care in the photography process to avoid distortions. The drafting method is inherently incapable of incorporating some of the necessary pattern modifications to provide good registry between the electron beam and the fluorescent pattern.

In some color tubes, the shadow mask type in particular, the individual mask used in each tube is employed as the master in making the screen for that tube. When master and mask are one and the same, no corrections of misregistry can be made within the mask itself, but must be made externally thereto.

Accordingly, it is an object of the invention to reduce the aforementioned difficulties and to provide an improved image reproduction device.

A further object is the provision of improved screens for image reproduction devices.

Another object is the provision of a method of producing improved image reproduction device screens.

A still further object is to provide an optical system and exposure device for producing improved screens.

Another object is the provision of a method and a device for reducing misregistry between electron beams and fluorescent material screen configurations arising from the tube geometry and structure, and such variances in electron travel from expected trajectory as are due to the center of deflection movement, the earth's field, electrostatic and magnetic fields, and in some tubes, convergence action of the electron beams.

Another object is the provision of a method and apparatus for producing screen photo-printing masters by a photographic printing technique wherein the final positions of the light rays are congruent with the final electron positions existing in the operating picture tube.

The foregoing objects are achieved in one aspect of the invention by the provision of a printing method using a refractive or reflective medium which causes the radiant energy or light rays used in the printing operation to be directed toward the panel in a manner that either a master grid or an image reproduction device screen will be formed with a pattern corrected in accordance with the above described factors effecting misregistry. This refracting medium is used in conjunction with a pre-determined positioning of the radiant energy source relative to the screen to provide proper sensitizing of the screen during processing.

For a better understanding of the invention, reference is made to the following description taken in conjunction with the accompanying drawings in which.

Figures 1, 2, 3, 4, 5:
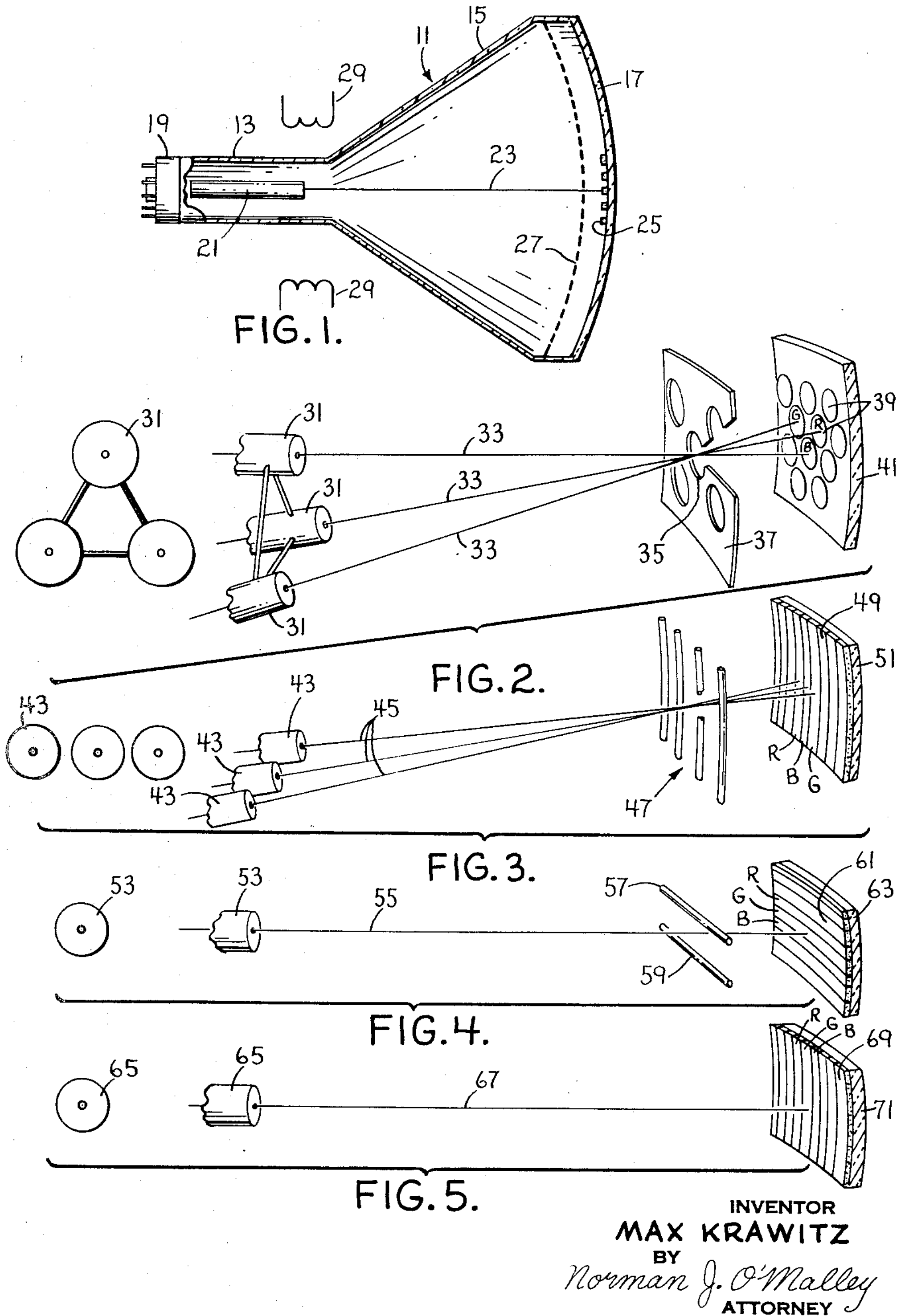
Fig. 1 is a cross sectional view of a typical cathode ray tube of the type employed in television receivers.
Figs. 2, 3, 4 and 5 are diagrammatic illustrations of four of the many types of cathode ray tubes which may embody one or more of the aspects of the invention.

Referring to Fig. 1, there is shown a typical image reproduction device of the cathode ray tube type employed in television receiving apparatus. The tube comprises an envelope 11 having a neck portion 13, funnel 15, and face panel 17. A tube base 19 is mounted upon neck 13 to provide the means for connecting the tube electrodes with their associated receiver circuitry. Mounted within neck 13 is an electron gun or guns 21 which provide the source of and acceleration, modulation and focusing for the beam or beams 23 utilized in the tube. A screen 25 comprising the usual configurations of electron responsive fluorescent materials is formed on the internal surface of panel 17. Positioned adjacent screen 25 is a mask or grid 27. The type of tube illustrated in Fig. 1 may use the grid 27 primarily to either focus or deflect beam 23 or to mask or mask and focus the beam to attain proper fluorescent excitation. To provide the raster for the screen, a pair of horizontal and vertical deflection coils 29 are mounted upon neck portion 13 adjacent the small diameter of funnel 15. These coils, upon proper energization of the deflection circuitry employed in the receiver, cause the beam or beams to be deflected in a manner well understood in the art.

Fig. 2 through 5 inclusive show diagrammatically four examples of the many types of tubes adapted to utilize one or more of the embodiments forming part of the invention. Fig. 2 illustrates a tri-gun shadow mask tube employing a large number of triads of blue, green and red color emitting phosphor dots arranged on the screen. The guns or emitters 31 are spaced equi-distant from one another and are mechancally mounted for static convergence at the mask or grid along the axis of the tube. The electron guns 31 each emit a stream of electrons 33 which converge at an aperture 35 in mask 37, and cross one another to impinge upon the associated phosphor dot 39 formed on panel 41. Generally, the final anode of guns 31 are maintained at the same potential as the mask 37 and screen 41 so that the electrons are traveling in a field-free space intermediate the gun and screen. However, a potential smaller in magnitude than the screen potential may be applied to the mask so that an electrostatic electron lens will be formed in each aperture to provide focusing action for each beam.

Fig. 3 illustrates a tri-gun post acceleration type tube utilizing groups of vertically disposed phosphor stripes, each group consisting of one stripe each of the red, green and blue color emitting phosphor materials. The electron emitters 43 are laterally aligned relative to one another so that the individual electron beams will statically converge along the plane of grid 47 and between preselected pairs of grid wires to cross one another and impinge upon the associated phosphor stripes 49 formed on panel 51. During operation of the tube, a lower potential is applied to grid 47 than to screen 49 so that an electrostatic electron focusing lens is formed between each pair of wires. Each lens so produced is shaped essentially as a semi-cylinder extending the length of the grid so that the electron beam will be focused in a horizontal direction over the entire raster. If desired, this type of tube could be constructed with three vertically disposed electron guns and utilize horizontally aligned grid wires and phosphor stripes.

Fig. 4 shows a single gun post deflection tube using a deflection grid and groups of horizontally disposed red, green and blue color emitting phosphor stripes, each group consisting of four stripes, two of one color and one each of the other two colors. In this instance, the single electron emitter 53 directs an electron stream 55 between the deflecting grids 57 and 59, which are electrically isolated from one another, to cause impingement thereof upon the proper one of the phosphor stripes 61 formed on panel 63. The electrons are deflected in accordance with the potentials on the grid wires at a given instant. It has been proposed that a tube construction of this type could employ vertically disposed grids and stripes with some modifications.

Fig. 5 illustrates a single gun type color picture tube using groups of vertical stripes formed from red, green and blue color emitting phosphor materials. The electron emitter 65 is caused to emit an electron stream which impinges upon the phosphor stripes 69 deposited on panel 71. Both the luminence and the chroma portions of the color signal are applied to the electron gun electrodes to cause modulation of the electron stream as it is moved horizontally across the screen. Generally, indexing lines are used in conjunction with the screen of this type so that accurate determination of the beam position can be relayed to the receiver circuitry.

A single gun, horizontal stripe type color tube of the general character described above utilizes spot wobble to affect similar results. In this instance, the horizontal scanning movement is changed from a substantially linear direction to one having a substantially saw-toothed form. The horizontal scan line therefor comprises a plurality of serially arrayed saw-toothed waves each of which transverses a group of red, green and blue color emitting phosphor stripes.

Still other types of tubes such as the flat electron discharge type have been proposed. Essentialy, these tubes are a modification of one or more of the tubes described above, with the primary deviation residing in the position of the electron gun relative to the screen. Generally, the gun is mounted either above, below or at the side of the screen. The electrons are projected initially in a direction having a component away from the screen, and the beam or beams are subsequently deflected to cause them to assume a path which is directed towards the screen.

Still another type of color tube employs a hollow tubular electron beam which is modulated to control the inside diameter of the beam. A screen having a large number of groups of red, green and blue color emitting phosphor materials comprising separate concentric circles each having a finite thickness is used in conjunction with this beam. Color images are reproduced by impingement of the tubular beam on one of the phosphor circles in each group.

Although a number of different types of color picture tubes have been described, it is to be understood that certain or all of the aspects described in the several recited embodiments of the invention are equally applicable to other types of image reproduction device structures and systems in addition to the types exemplified herein.

Figure 6:
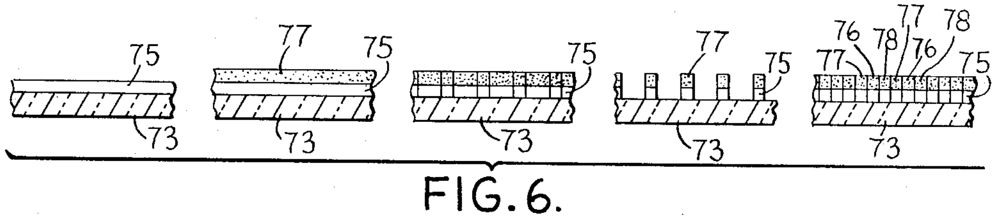
Fig. 6 is a series of cross sectional views of the face panel of a cathode ray tube showing the steps embodied in the method of forming a cathode ray tube screen.

As previously stated, the process of forming the phosphor screen employed in the tube utilizes a photographic printing technique. Fig. 6 shows the essential steps included in this operation, which is begun by coating the internal surface of a glass face panel 73 with a radiant energy sensitive substance 75, such as the light sensitive material, polyvinyl alcohol sensitized with ammonium dichromate. This coating may be applied by flowing, spraying, or other similar fluid depositing methods. A fluorescent material 77 such as the red phosphor, zinc phosphate, is next applied to substance 75 in any convenient manner such as by spraying or dusting. If desired, the radiant energy sensitive substance 75 and phosphor material 77 may be intermixed initially to form a slurry which may be subsequently deposited on panel 73. Preselected areas of the layer comprising substance 75 and phosphor material 77 are then exposed to a radiant energy source such as a point source of light through an appropriate mask or negative master. The exposed areas become hardened and adhere to panel 73. The pattern so produced is next developed by the application of a developing fluid such as deionized water to the panel to remove the unhardened areas and to produce a series of bars, stripes, or dots consisting of the red color emitting phosphor material 77 and its associated hardened substance 75.

The aforementioned operation is repeated using blue and green color emitting phosphor materials, with appropriate off-setting of the light source during each exposure operation to produce the complete viewing screen shown in Fig. 6. The green phosphor material, zinc orthosilicate, and the blue phosphor material, zinc sulfide, are indicated in the drawing by the numerals 76 and 78 respectively. Two examples of a phosphor screen made by this process and adapted to be employed in a color picture tube are illustrated by the tri-dot pattern in Fig. 2 and the stripe patterns of Figs. 3, 4 and 5.

Figure 7:
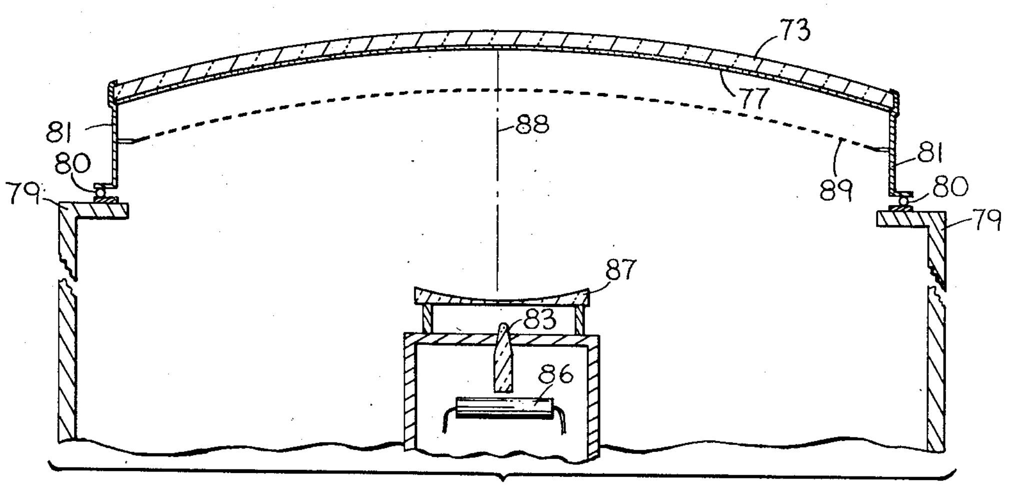
Fig. 7 is an illustration of an apparatus used for the production of screens for cathode ray tubes.

The exposure operation utilized in the screen forming process uses a "lighthouse" apparatus such as the one shown in Fig. 7. After the glass panel 73 has been coated with the radiant energy sensitive substance 75 and the desired fluorescent material 77, it is placed upon frame 79 and aligned therewith radially and axially by means of the cooperation between bumps 80 formed on the bottom surface of panel rim 81 and grooves formed on the top surface of frame 79. Inside the frame is a light rod or transmitter 83 which collects light from the cylindrical lamp 86. The rod is diffusely ground and performs as a "point source" radiating light toward the panel. Mounted above light rod 83 is a light refractive medium or lens 87 which refracts the light rays to provide certain corrections for the positions of the screen material configurations as will be hereinafter described. The light source 83 and lens 87 are offset at a pre-determined distance from the axis 88 of panel 73 for each of the three separate color pattern configuration forming processes. A negative master 89, such as a grid or aperture mask, is positioned intermediate the light source 83 and face panel 73 to provide proper masking of the screen material so that only the desired areas of the screen will be exposed for any given pattern forming operation. In a conventional shadow mask tube, the distance from the tip of light rod 83 to the center of lens 87 may be approximately 1⅞ inches, the distance from lens 87 to grid 89 may be approximately 13.7 inches, and the grid to screen distance may be approximately ½ inch. However, assuming a lens system having the proper optical aberration, it can be seen that the diameter of the lens will determine the light rod to lens dimension and the lens to grid dimension. Preferably, the distance between lens 87 and grid 89 will be larger than between the lens and rod in order to minimize lens fabrication problems and cost and to enhance efficiency of the exposure device and process.

Some color tube screen processes utilize one negative master mask or grid to form all of the screens made by the screen photo-printing operation. In other processes, the mask or grid itself serves as the negative in the screen printing process performed on the particular viewing panel with which it will be later employed in the finished tube. In the first instance, the master may incorporate a complex pattern which, when projected upon the screen panel by a simple point source of light will yield the desired fluorescent configuration. Alternately, a more simple master pattern may be used in conjunction with a more complex optical system to yield the desired fluorescent configuration. In the second instance, while the mask or grid pattern may be simple or complex, an optical system in which the termination of the light paths correspond with the termination of the electron paths in the operating tube is a necessity. In either instance, it is manifestly important that all masters, masks, grids, and optical systems employed be made with a very high degree of accuracy and in accordance with a form necessitated by the tube structure, geometry and operative characteristics so that color pure images will be realized in the operating tube.

Figure 8:
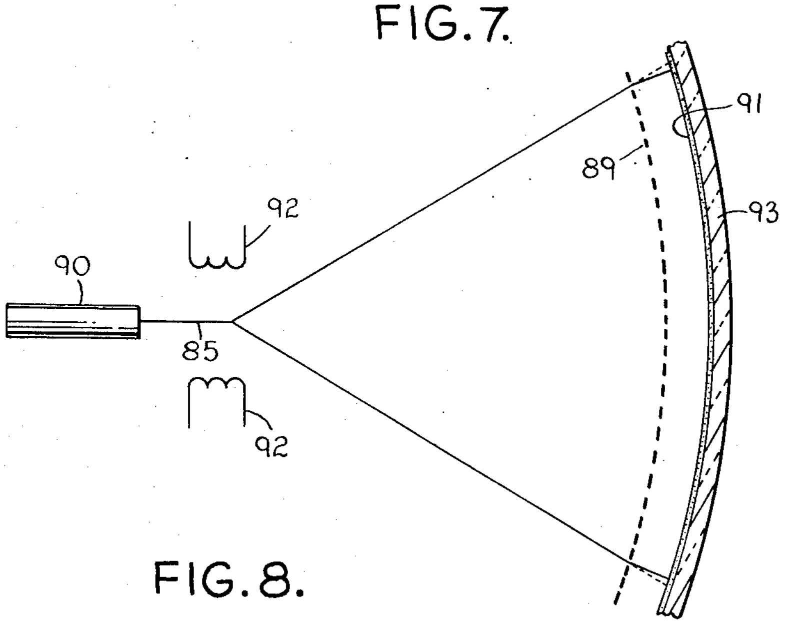
Fig. 8 is a diagrammatic illustration of the trajectory of an electron beam within a cathode ray tube of the type shown in Figs. 3 and 4.
Figure 9:
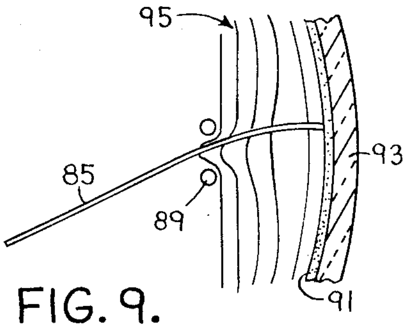
Fig. 9 shows the electrostatic field existing near the screen of a tube of the type shown in Figs. 3 and 4.

Picture tubes using a mask or grid operating at voltages which are smaller in magnitude than the screen potential are generally obliged to use fluorescent configurations shaped in a non-uniform manner. For instance, a screen of the post deflection type such as the one shown in Fig. 4 having horizontal stripes adapted to be used with a pair of grid wires straddling each group of three phosphor stripes are non-uniformly spaced and are formed in a non-linear manner along their length in order to provide reproduction of an image having color purity. This is necessary since the spacing and form of these stripes must conform to the horizontal scan lines of the electron beam. Referring to Fig. 8, the aforementioned type of tube has an electron emitter 90 providing an electron stream 85 which is deflected by coils 92. While the electrons are traveling between the deflection region and the grid 89, they proceed substantially along a straight line. During their travel between the grid and the phosphor screen 91 formed on face panel 93 they are continuously bent or deflected. Referring to Fig. 9, the non-linear trajectory of beam 85 is caused by the action of the electrostatic field 95 which is formed by the potential difference between the grid wires 89 and the screen 91.

Figure 10:
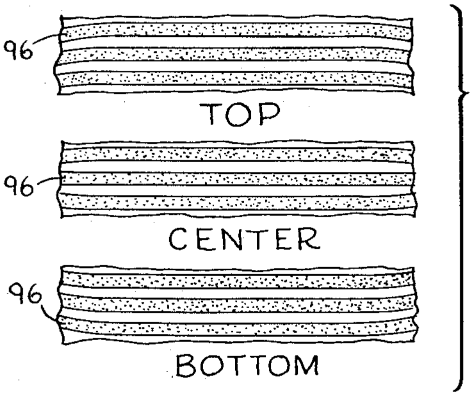
Fig. 10 illustrates exaggerated portions of the screen fluorescent material patterns existing in a cathode ray tube of the type shown in Fig. 4.

A screen constructed for operation in the type of tube shown in Fig. 8 must comprise stripes 96 of fluorescent materials formed as shown in Fig. 10 in order to insure acceptable color pure image reproductions. The center stripe will be substantially straight across the screen, with other stripes 96 becoming more curvilinear with an increase in distance above and below the center stripe. In effect, the stripes are curved more over those areas of the tube which require a larger electron beam deflection angle. The stripes also may become less widely spaced apart with an increase in distance from the horizontal axis of the screen.

Figure 11:
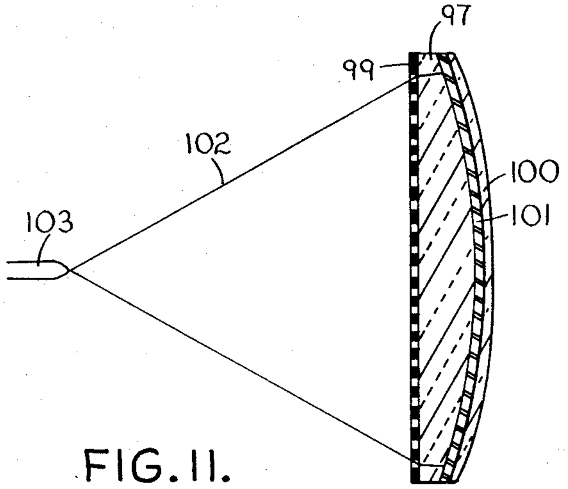
Fig. 11 shows a photo-printing lens system for forming a pattern of the type illustrated in Fig. 10.

Since negative masters are employed in the printing process used to form the screen, it is necessary to make the master configuration in accordance with the stripes shown in Fig. 10. To achieve this result, an optical system having a refractive characteristic equivalent to the refractive characteristic of electron field 95 is employed in the printing process which is used to form the master. Fig. 11 shows the application of such a lens and the relative positions of the lens and associated components during the exposure operation of the printing process. The glass lens 97, which is plano-convex in form, has a uniform grid 99 positioned adjacent one of its surfaces and a plate 100 having a photographic emulsion 101 formed thereon positioned adjacent the opposed lens surface. The light rays 102 emanating from light rod or transmitter 103 are refracted as they pass through lens 97 to simulate the trajectory of electron beam 85 as it passes through the electrostatic field 95 shown in Fig. 9. The light sensitized emulsion pattern produced by this exposure may be used, after conventional development, to form a phosphor pattern like the one shown in Fig. 10.

Since the art of photographically producing a negative of an image is well known, it is not felt necessary for the purposes of this description to discuss such a process in detail. The negative produced by the exposure and development operation may then be used as the grid or mask employed as a master in the screen printing operation and be of the type designated in Fig. 7 by the numeral 89. It is to be understood that grid 99 may be formed to shadow either the areas of emulsion 101 intermediate the desired stripes, or identically over the stripe areas. The form of grid 99 will determine whether it will be possible to use the negative for production of the screens, or whether it will be necessary to produce a conventional positive image for this purpose.

Figure 12:
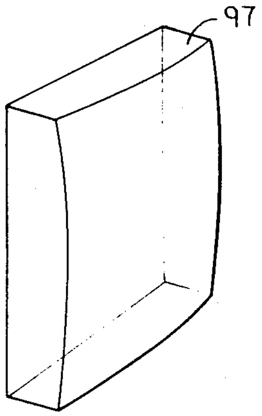
Figs. 12 and 13 illustrate several of the many types of lens which may be used with the system shown in Fig. 11.
Figure 13:
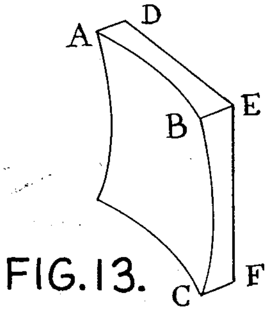

Fig. 12 shows more clearly the symmetrical plano-convex lens 97 adapted to be used in the process illustrated in Fig. 11. The index of refraction and thickness of the medium will determine the amount of refraction of the light rays needed to duplicate the action of electric field 95 on beam 85. Fig. 13 illustrates another type of lens adaptable for use in the printing technique illustrated in Fig. 11. In this instance, grid 99 would be placed adjacent concave surface ABC, while emulsion 101 would be positioned adjacent surface DEF. A planar lens of the correct thickness and index of refraction could also be used in this manner for some particular tube structures.

Figure 14:
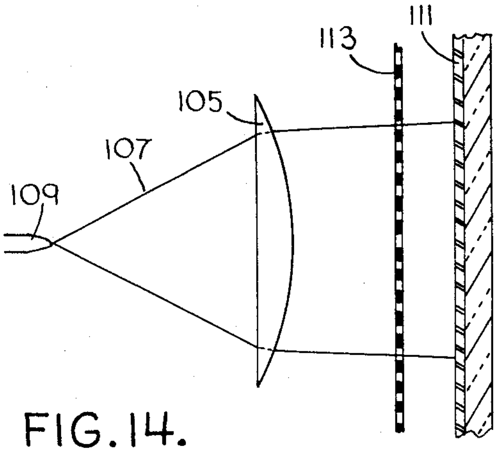
Fig. 14 shows another embodiment of the system illustrated in Fig. 11.

Fig. 14 shows another optical system which may be used to produce masks or grids for picture tubes having screens similar to the one illustrated in Fig. 10. In this instance, a plano-convex lens 105 is used to refract light rays 107 radiating from transmitter 109 to sensitize photographic emulsion 111 through mask 113. It can be seen that an appropriately formed lens having the correct amount of spherical aberration can produce a final point for each light ray in conformity with a position of the electron beam at the screen. Accordingly, this optical system provides an automatic means for correcting for the curvilinear path of the electron beam caused by the electrostatic field producing forces existing in the picture tube.

An optical system such as the one shown in Fig. 14 comprising light source 109 and lens 105 effectively forms a locus of motion of apparent light ray origin which coincides in direction and magnitude to the locus of motion of the apparent center of deflection of the electron stream employed in the tube. Proper positioning of this optical system relative to emulsion 111 in an apparatus such as the one shown in Fig. 7 causes the locus of the apparent light ray origin to be superimposed in space upon the locus of the apparent center of deflection during the exposure operation as will be more fully described hereafter. A straight line projection backwardly from surface 91 through grid 89 for any given electron beam deflection angle will intercept the axis of the electron beam at a given position. The optical system shown in Fig. 14 simulates this same intercept position in space for a light ray at the same deflection angle during the exposure operation.

Figure 15:
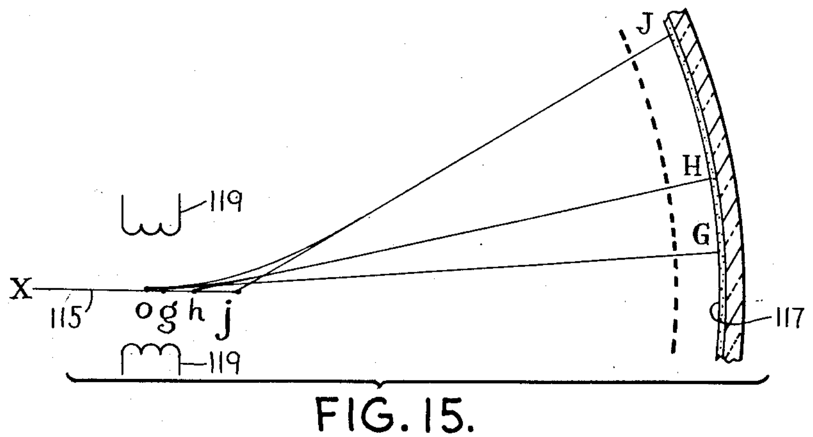
Fig. 15 is a diagram illustrating the motion of the apparent center of deflection of an electron stream in a typical cathode ray tube.
Figure 16:
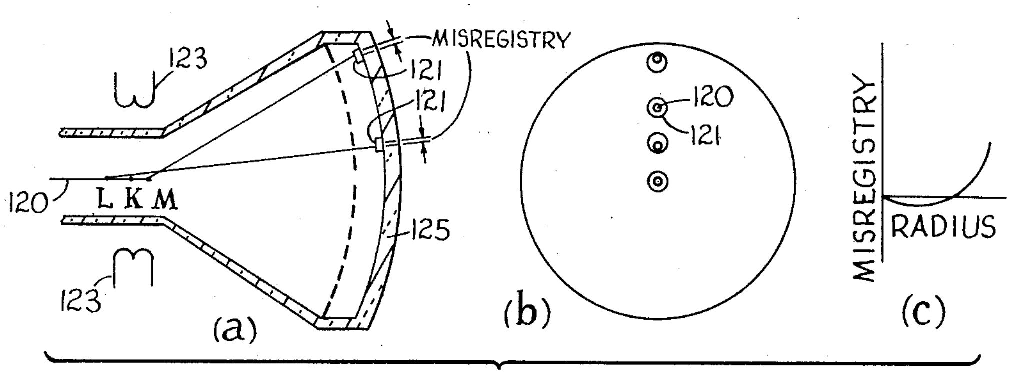
Fig. 16 illustrates one type of misregistry resulting from the motion of the apparent center of deflection as shown in Fig. 15.
Figure 17:
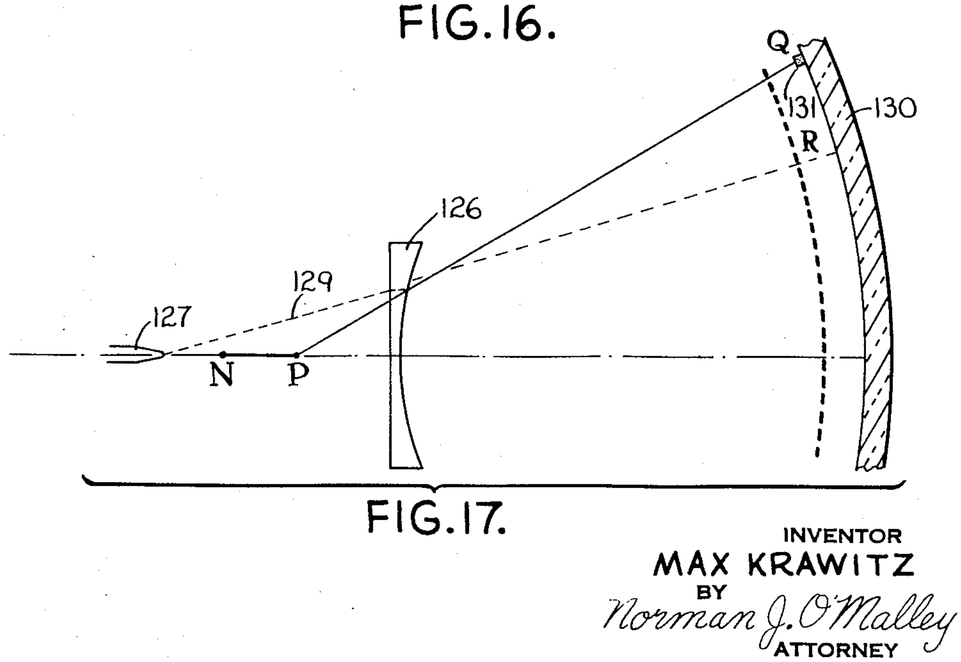
Fig. 17 illustrates a light optical system formed to provide light ray travel in accordance with the electron travel in a tube of the type illustrated in Fig. 16.

The motion of the apparent center of deflection referred to above and the optical method of compensating for it can be better understood with an analysis of cathode ray tube geometry as illustrated in Figs. 15 through 17 inclusive.

The misregistry error caused by the motion of the apparent center of deflection is radial with respect to the tube axis. However, in cathode ray tubes such as those illustrated in Figs. 3, 4 and 5, the error is more noticeable in the direction perpendicular to the direction of the stripes. For reasons of simplicity, this occurrence will be described in Figs. 15 through 17 inclusive with one electron gun and one set of phosphor dots of a tri-gun aperture mask type tube such as the one illustrated in Fig. 2. Referring to Fig. 15, an electron beam 115 is projected towards screen 117 along axis X until it reaches the deflection field created by yoke coils 119, at which time it is caused to follow the paraxial path from point O to a point G at the screen. Wider or extra-axial deflection angles are also shown at points H and J on the screen. Projecting back from these points through the corresponding mask holes, it can be seen that the beam appears to come from points *g*, *h* and *j* respectively rather than from point O. This diagram exemplifies the motion of the apparent center of deflection for several deflection angles of one beam employed in the picture tube. It will be observed that the electron beam appears to emerge from the deflection region at a point successively closer to the screen for successively larger deflection angles. All of the points between point O and point *j* defines a line which is the locus of motion of the apparent center of deflection.

The process for forming the phosphor screen described heretofore employs a light source which radiates from a given stationary position which is known as the color center. It can be seen from Fig. 16 that misregistry will occur between the impinging electron beam 120 and the phosphor configurations 121 unless the color center can be made to move in accordance with the center of deflection during the screen forming process. An optimum position of the deflection coils 123 on the neck of the tube will result in radial misregistry occurring as indicated by the graph in Fig. 16(*c*). It will be observed that registry between the electron beam and the fluorescent dot in this instance occurs at the center point of the screen and at approximately ¾ of its radius. Fig. 16(*b*) illustrates the appearance of the misregistry at several of the large number of positions on the screen. Referring to Fig. 16(*a*), the phosphor dots 121 were formed on panel 125 by an exposure operation from point K whereas the electron beam 120 appears to come from points L and M. The resulting misregistry is indicated by the arrows in the drawing.

It is to be understood that the graph shown in Fig. 16(*c*) is for only one position of the deflection coils 123 along the neck of the tube. Although the curve will remain substantially constant in form, it will move above or below the abscissa as the coils are moved forward or backward respectively of the position shown in Fig. 16(*a*).

In order to match the end points of the light rays employed in the exposure operation with the landing points of the electrons, a refractive medium or lens such as the symmetrical plano-concave spectacle crown glass lens 126 illustrated in Fig. 17 is used. During the screen forming operation, this lens is positioned on top of the light source structure and intermediate the source and the screen as indicated in Fig. 7 by the numeral 87. Since the locus of the motion of apparent center of deflection in the operating tube moves forward with an increase in deflection angle, the apparent origin of the light source is caused to follow a locus in the same manner. The light transmitter 127 radiates a beam 129, which, if it were not refracted by the lens 126, would strike the screen 130 at point R. However, the electron beam for the same deflection angle appears to come from point P and strike the screen at point Q on the phosphor dot 131. Accordingly, the light beam 129 is refracted by lens 126 to effectively superpose the light beam 129 on the electrton beam so that it also appears to come from point P. In this manner, the radial misregistry between the fluorescent configurations and the electron beam heretofore encountered is automatically corrected during the screen forming process.

The use of the exposure device or lighthouse shown in Fig. 7 enables superimposition in space of the locus of motion of the apparent light origin upon the locus of motion of apparent center of deflection during the exposure operation, with the photo-sensitive screen surface being the reference point in both instances. In Fig. 17, line N—P has the same magnitude and position relative to the face panel as line O—J shown in Fig. 15. Point N designates the paraxial light ray intercept position and point P designates one of the extra-axial intercept positions. A convenient method of defining the magnitude of locus N—P for any given deflection angle is in terms of optical aberration. An optical system comprising lens 126 and light source 127 may be constructed so as to have an optical aberration equivalent to the length of the locus of motion of the apparent center of deflection for all deflection angles. This optical aberration may be defined in terms of a unit of length, e.g., millimeters, which is measured along a reference axis between the intercept position of the paraxial light rays and the position of the extra-axial light rays. Optical aberration is referred to as being spherical when it is caused by the spherical form of the lens.

The method of space superpositioning the locus of motion of the apparent light ray origin upon the locus of motion of the apparent center of deflection was used in the embodiment of the invention shown in Fig. 14. However, in this instance, due to the form of lens 105, the locus of motion of apparent light ray origin lies behind light source 109 and the succeeding extra-axial intercept points move backwardly for increasing deflection angles.

Although a plano-concave lens has been illustrated in Fig. 17, it is to be understood that a planar lens with the proper thickness and index of refraction can be used in addition to more complicated lens surface configurations. The plano-concave lens shown is a preferred form because it is inherently easy to fabricate to high accuracy, can be readily located and held in accurate relationship to the light source and provides a relatively large motion (spherical aberration) for its size. The lens shown in Fig. 17 will give a satisfactory match with the electron optics produced by deflection yokes now employed with a spherical-faced 21 inch shadow mask type screen if it is positioned approximately 1⅞ inches from the light source, has a center cross section thickness of approximately 4.5 millimeters, and has a concave surface radius of approximately 23½ centimeters. Under these conditions, the lens is positioned approximately 13.7 inches from the grid or mask of the tube.

Another factor affecting registry between the electron beam and fluorescent configuration in a color picture tube is introduced by the earth's magnetic field. It is well known that for any geographical location on the earth's surface, the vertical component of the earth's field varies in magnitude. However, the vertical component of the earth's field differs very little for the most populated areas in the Northern Hemisphere. Consequently, any misregistry caused by the magnetic field component can be substantially compensated for in the majority of television receivers produced. It should be noted that the force exerted by the horizontal component of the earth's field cannot be compensated for internally within the tube because it is different for each position of rotation at any given geographical location.

Figure 18:
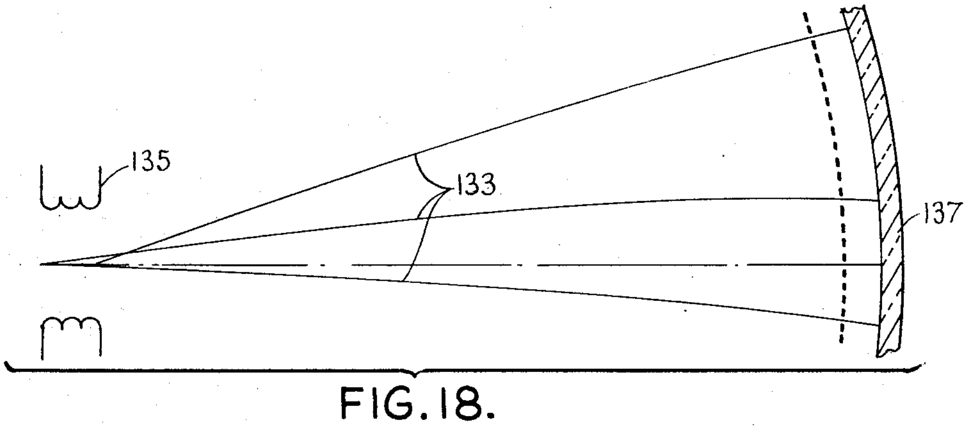
Fig. 18 shows the effects of the earth's magnetic field on the electron beams employed in a picture tube.

Referring to Fig. 18, the force exerted by the vertical component of the earth's field causes electron stream 133 to be continuously bent as it progresses from the region of the deflection coils 135 to the face panel 137. While bending also occurs in the neck region of the tube between the electron gun and the deflection coils, the effect is of relatively small significance and will be ignored in this discussion for the sake of simplicity. Several deflection angles have been shown to illustrate the equivalent effects of this force on the beam over the entire horizontal scan area.

Figure 19:
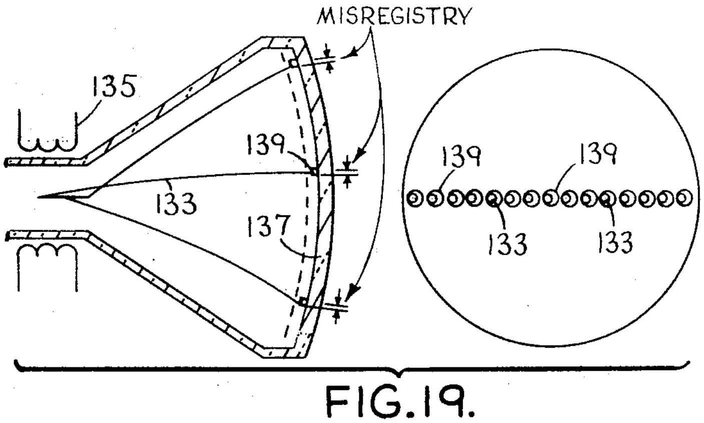
Fig. 19 is a diagram illustrating the type of misregistry caused by the earth's field.

The effects of this field on an electron beam may be best understood by observing the type of misregistry it causes if no steps are undertaken to compensate for it. Fig. 19 shows several phosphor dots 139 arranged horizontally across the central portion of picture tube face panel 137. The vertical component of the earth's field exerts a force on electron beams 133 to cause them to impinge upon the screen off-center of the dots 139. This type of misregistry is commonly referred to as transverse misregistry.

Figure 20:
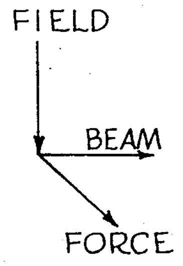
Fig. 20 is a vector diagram illustrating the manner in which the vertical component of the earth's magnetic field operates on an electron beam.

Although the screen shown in Fig. 19 is again exemplifying one gun of a shadow mask tube structure, it is equally applicable to other types of tubes, particularly those employing vertically disposed phosphor stripes or bars. The magnitude of misregistry is shown to be existing only within a particular phosphor dot area, however, the actual amount is much larger without the aid of magnetic shields. Although shielding reduces the effects of the field, it is a costly structural item and it does not completely compensate for these field effects. Fig. 20 is a vector diagram illustrating the direction of force exerted on the electron beam due to the influence of the vertical component of the earth's field.

Figure 21:
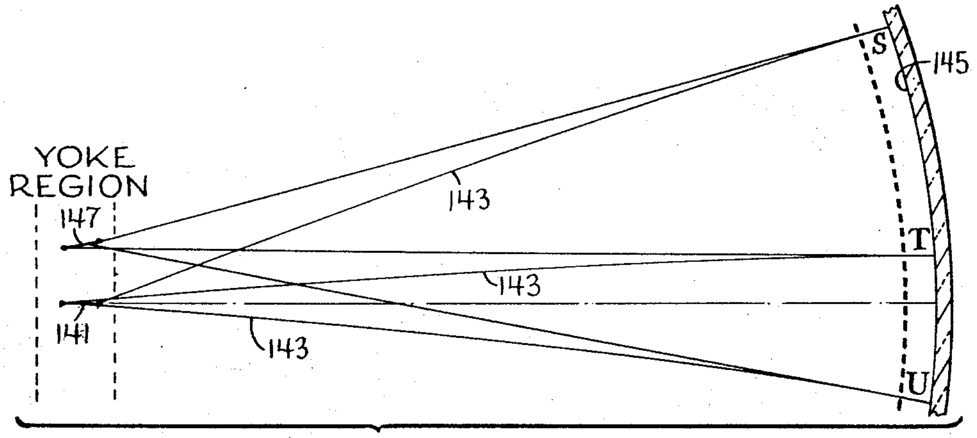
Fig. 21 shows the locus of the apparent movement of the center of deflection of beams acting under the influence of the earth's field.

Referring to Fig. 21, a single beam is shown for simplicity of analysis of the beam trajectory resulting from the influence of the vertical component of the earth's field. The electron stream 143 is shown deflected over several different angles to strike the screen 145 at points S, T and U. Projecting backwardly from these points, it appears that the locus of the apparent center of deflection is a line 147 extending at an angle and offset laterally from the locus 141 which was described more fully in connection with Fig. 15. It can be seen that the force exerted by the vertical component of the earth's magnetic field is therefore transverse across the screen, and that it moves the apparent center of deflection toward the right side of those tubes operated in the Northern Hemisphere.

Figure 22:
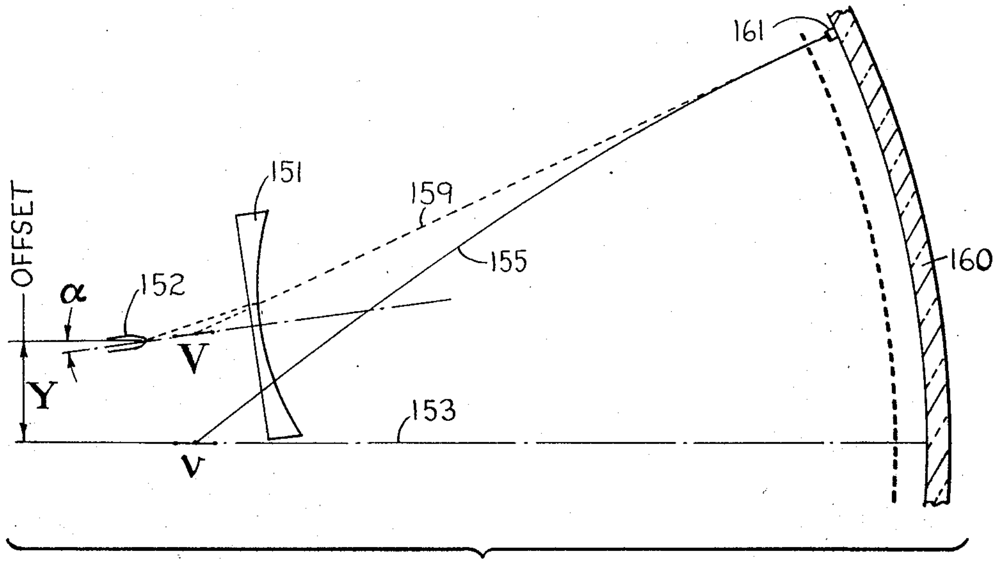
Fig. 22 shows an optical system for matching the light optics utilized in the screen forming process with the electron trajectory shown in Fig. 21.

During the picture tube screen forming process, the lens has been previously described as being placed along the axis of the imaginary electron gun. In order to compensate for the variance in direction of travel of the electron beam during tube operation due to the average vertical component of the earth's field, the lens is appropriately moved to a position whereat its locus of motion of light ray origin coincides with the locus of motion of the apparent center of deflection of the electron beam. Referring to Fig. 22, it can be seen that if the light rod 152 is offset laterally a distance Y and tilted at an angle alpha ($\alpha$) from the undeflected axis 153 of the electron beam 155, the light ray 159 will be refracted by lens 151 so that it will strike the screen 160 at the same point as the electron beam 155 strikes dot 161. The light ray 159 appears to come from a point on the apparent light source locus V, which point duplicates a point on the apparent electron beam locus V, after it has been offsett and moved with the locus to its tilted position. Although the amount of tilt and offset needed in the optional system will be dependent upon the amount of shielding employed with the tube, an order of magnitude can be cited as an example. The tilt angle alpha ($\alpha$) may be from 2° to 5° while the average offset Y may be from ⅛ to ½ inch when using a symmetrical lens of the type heretofore described.

A lens system of the type shown in Fig. 22 can be employed with a screen photo-printing operation such as the one described in connection with Fig. 7 to automatically compensate for variances in direction of electron travel due to the apparent motion of the center of deflection as heretofore described, and to the action of the vertical component of the earth's magnetic field on the beam.

Color tubes which use a printing technique to form the fluorescent configuration pattern on the screen usually offset the face panel axis or light transmitter axis relative to one another for each exposure operation in order to produce the separate color emitting phosphor patterns. In doing so, one portion of the screen is inherently closer to the light transmittter or point source of light for any given exposure and will therefore receive more light energy per unit area. Since the amount of light and the exposure time determines the hardening action of the sensitized polyvinyl alcohol used in the operation, better adherence uniformity between the glass face panel and phosphor materials may be acquired by tilting the light rod so that its axis lies in the direction of the normally underexposed area. Effectively, this insures better uniformity of dot size near the edges of the screen by making the brightness of the apparent light source more nearly the same for all sections of the screen equi-distant from screen center.

Figure 23:
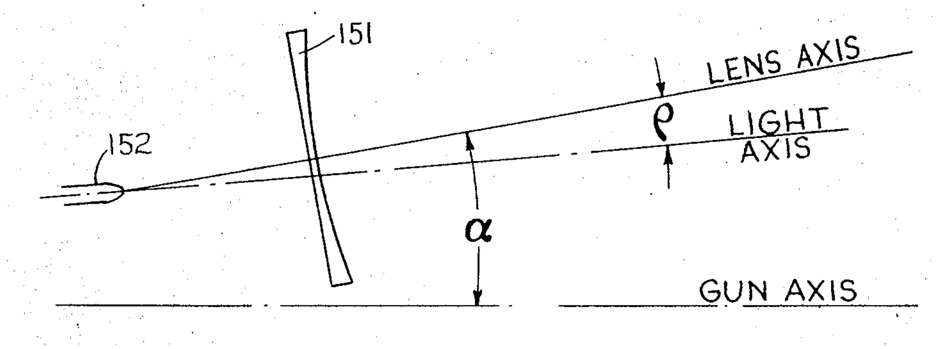
Fig. 23 illustrates a variation of the position of the light source relative to the lens from that illustrated in Fig. 22.

Fig. 23 illustrates a further application of this principle by adapting it to the optical system shown in Fig. 22. Here, the axis of lens 151 is tilted from the electron gun axis an angle alpha ($\alpha$) while the axis of light rod 152 is tilted an angle rho ($\rho$) from the lens axis. Since attenuation of light emanating from source 152 increases as the distance from the lens axis increases, and since the light output of source 152 decreases with an increase in distance from its tip, tilting the light axis in the opposite direction in the manner shown in Fig. 23 gives improved light distribution over the entire screen. The angle rho ($\rho$) may be approximately equal and opposite to the angle of tilt between the lens axis and gun axis. However, this angle is dependent upon the lens composition and size.

A still further application of an optical system to electron tube processing is realized with the provision of means for compensating for misregistry between the electron beam and the phosphor material configurations caused by dynamic convergence effects in a multi-gun type color picture tube.

Figures 24, 25, 26:
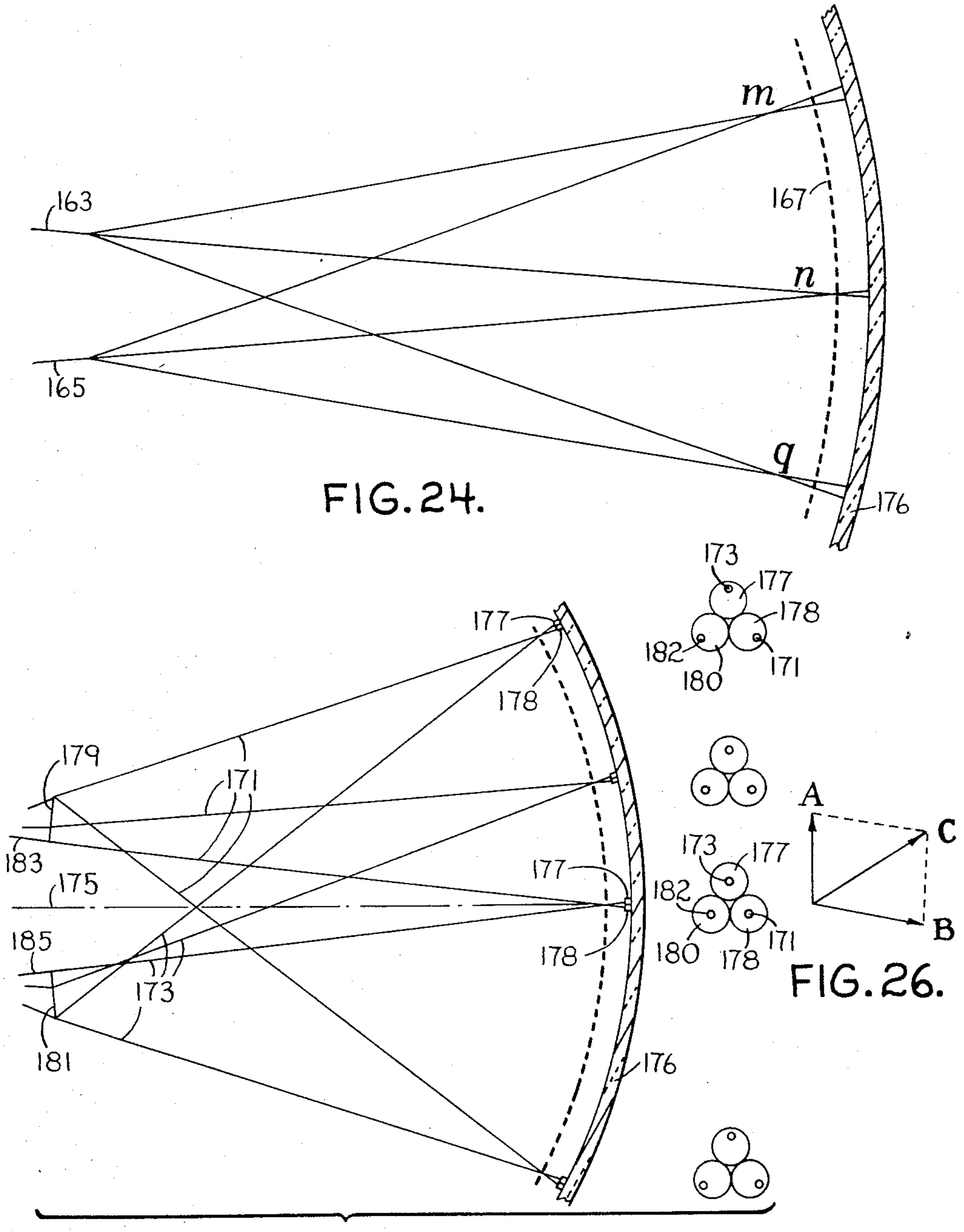
Fig. 24 illustrates several electron beam paths without dynamic convergence.
Fig. 25 illustrates the electron beam paths with dynamic convergence and the resulting misregistry.
Fig. 26 shows the resultant direction of the locus of beam deflection with dynamic convergence.

It is well known that dynamic convergence is needed to maintain the cross-over point of the electron beams at the mask or grid of a multi-gun picture tube. Referring to Fig. 24, if dynamic convergence is not used, the electron beams will intersect at positions within the tube other than at the mask or grid position. Two electron beams 163 and 165 are shown converging at the one position *n* along the axis of the tube, but they intersect at positions *m* and *q* as the deflection angles are increased. In most instances, the electron gun emitters are mechanically positioned to correctly converge at the static convergence point *n* in the tube as illustrated in Fig. 24. Accordingly, dynamic convergence assemblies must be employed in conjunction with the deflection coils used with the tube so that the inter-beam distances can be regulated in the yoke or deflection area to effectively cause the beams to intersect at the surface of the grid or mask 167 for all deflection angles. It is apparent from Fig. 24 that the electron beams 163 and 165 must be moved further apart in the deflection region for larger deflection angles to achieve proper convergence. This is what the dynamic convergence magnets do to the beams in the operating tube and receiver.

The manner in which dynamic convergence affects the locus of the apparent motion of the center of deflection is illustrated in Fig. 25. As the deflection angles of electron beams 171 and 173 are increased, these beams appear to come from positions progressively further away from the tube axis 175 when viewed from the phosphor dots 177 and 178 on face panel 176. The loci 179 and 181 of these moving points defines lines which extend substantially at right angles from the undeflected beam axes 183 and 185 respectively.

Application of dynamic convergence to the electron beam cause misregistry between the beam and the phosphor dots used on the screen of the tube. The cross sectional diagram of Fig. 25 shows, for simplicity, two of the three electron beams used in a conventional shadow mask tube of the type illustrated in Fig. 2. In order to better understand the appearance of the misregistry with three electron guns, Fig. 25 also shows an enlarged group of triads positioned in accordance with the various deflection angles illustrated. It can be seen that misregistry between the centers of the phosphor dots 177, 178 and 180 and their respective electron beams 173, 171 and 182 (not otherwise shown) are radial in nature and increases as the deflection angle increases. This misregistry results from the action of the dynamic convergence magnets used with the tube which force the beams farther apart in the deflection region, thereby causing them to be farther apart at the screen.

To understand more easily the relative direction of the locus of the apparent center of deflection, the vector diagram shown in Fig. 26 may be used. Since the electron beams must be moved further away from one another as the deflection angle increases in order to maintain convergence at the grid of the tube, movement of the locus of the apparent center of deflection in accordance with these effects will be in the direction indicated by line A, which is at right angles to the axis of the electron beam. In addition to this movement, it was previously explained that the motion of the apparent center of deflection of the beam also moves toward the screen with increased deflection angles as indicated by line B. The vector C is formed by the resultant of these motions as shown in the diagram. Accordingly, the locus of the apparent center of deflection, when considering dynamic convergence effects and tube geometry, will lie along line C.

Figure 27:
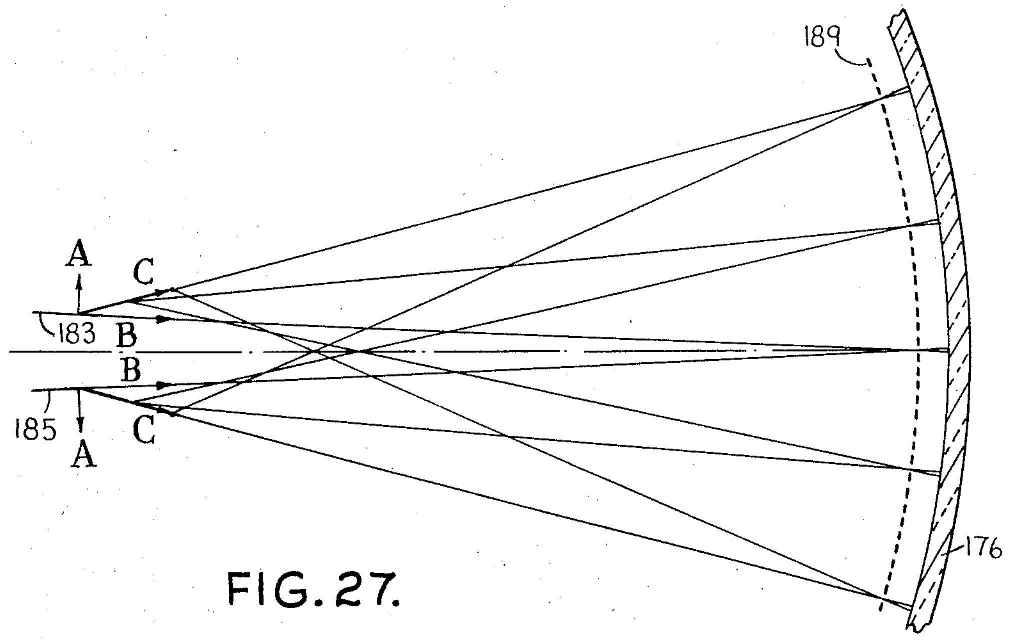
Fig. 27 shows the locus of the apparent center of deflection applied to the picture tube when considering both dynamic convergence and center of deflection motion.

Fig. 27 shows the application of this principle to the picture tube. The two beams 183 and 185 proceed toward face panel 176 to intersect at grid 189. During static convergence conditions, the beam axes lie along line B. When dynamic convergence is applied and as the deflection angles increase, the center of deflection appears to move along line A, thereby providing a resultant vector C defining a locus of points from which the electron beams 183 and 185 appear to come from when viewed from face panel 176. In order to place fluorescent material configurations on the face panel 176 so that the electron beams will strike their centers, the locus of the apparent light source used in the screen forming process is made to conform to vector C.

Figure 28:
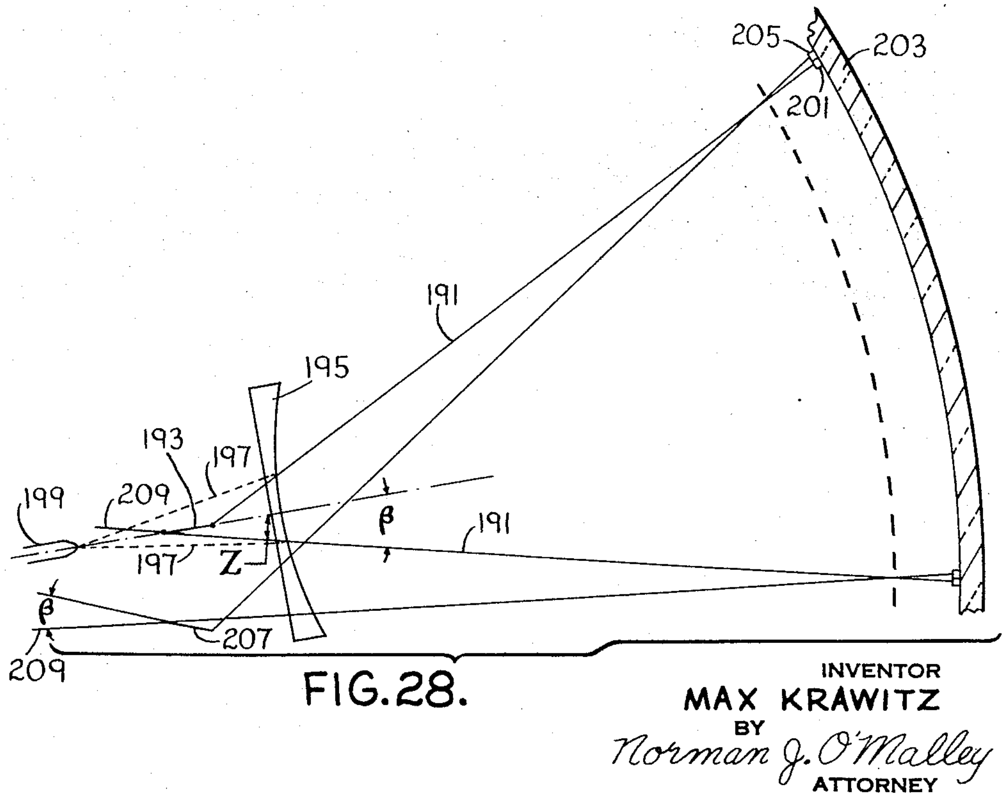
Fig. 28 is an optical system for matching the light optics with the electron positions shown in Fig. 27.

Referring to Fig. 28, the locus of the apparent motion of the center of deflection of one electron beam 191 is indicated by the line 193. The plano-concave lens 195 which is similar to the lens 87 in Fig. 7, is used during the screen forming exposure operation to cause light rays 197 radiating from light transmitter 199 to be refracted and cause the fluorescent material dots 201 to be formed on face panel 203 at the exact position where the electron beam will strike. As previously explained, the formation of other phosphor configurations such as dot 205, which has different color fluorescent characteristics than dot 201, will be formed by offsetting or positioning light rod 199 and lens 195 so that their axis will lie along locus 207. It can be seen from Fig. 28, therefore, that in order to account for variations of the electron beam trajectories due to dynamic convergence effects, the light optical system used to form the picture tube screen patterns are tilted an angle beta ($\beta$) with respect to the axis 209 of the electron gun. Due to the position of lens 195 relative to the electron gun axis 209, this lens is effectively offset therefrom a distance Z, which may be approximately ¼ inch and tilted an angle beta ($\beta$), approximately 10°, when using a lens of the type heretofore described.

The optical system above described has been exemplified in part with two electron beams of the three shown and described in Fig. 2 as the shadow mask type tube for the purpose of simplicity. However, it is applicable to all types of picture tubes employing multiple electron beams. If desired, light transmitter 199 may be tilted from the lens axis towards beam axis 191 to provide substantially constant light attenuation over the screen in accordance with the arrangement shown in Fig. 23.

Figure 29:
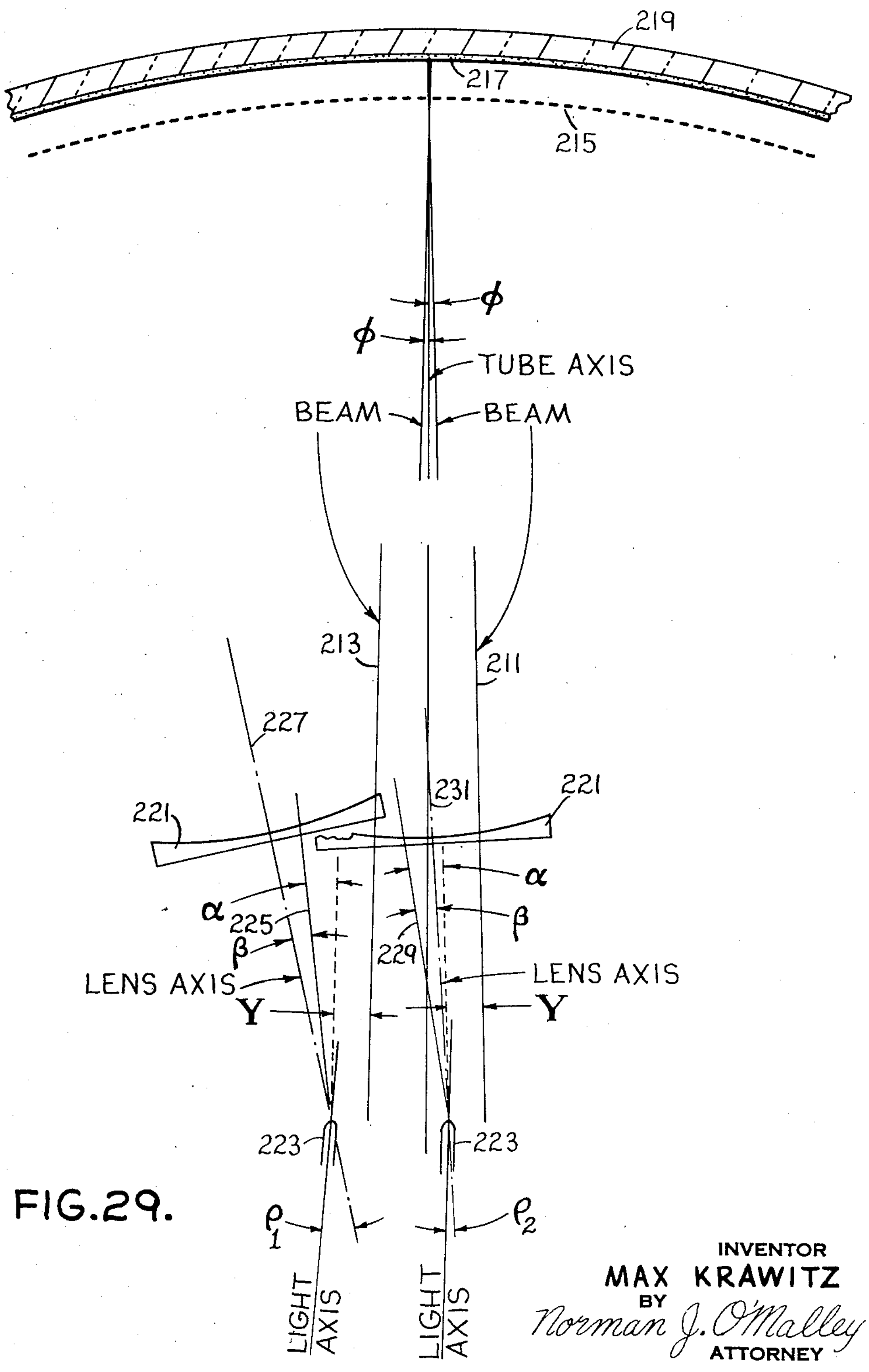
Fig. 29 is an optical system using several of the embodiments illustrated in previous drawings.

Fig. 29 illustrates the manner in which the optical systems herebefore described may be combined and used to produce screens for color picture tubes which will have the fluorescent material configurations formed and positioned on the face panel so that they will register with the impinging electron beam or beams employed in the tube. For convenience of illustration, two static position electron beam axes 211 and 213 are shown intersecting at grid or mask 215 and crossing one another to intercept the fluorescent screen material 217 formed on face panel 219 at adjoining positions. These positions will ordinarily be covered wtih different color emitting phosphor materials as previously explained. The axes 211 and 213 are shown to lie at the static convergence angle phi ($\phi$) from the longitudinal axis of the tube.

The plano-concave lens 221 is similar to lens 87 shown with the screen forming exposure apparatus in Fig. 7, and it is employed in the same manner except for variations in distances from the axis of panel 73 and the angles of the light rod 83 and lens 87 relative to one another and to the axis of panel 73.

In order to compensate for the apparent motion of the center of deflection toward the screen for increasing deflection angles as illustrated by Figs. 15 through 17 inclusive, the lens 221 is employed. This drawing shows one optical system including lens 221 arranged at the two positions which will produce the color emitting phosphor configurations dictated by the two electron beams shown.

Referring first to the optical system position relating to beam 213, the light transmitter 223 is offset a distance Y parallel to the axis of beam 213, while the lens 221 and light rod 223 are tilted from axis 213 by an angle alpha ($\alpha$) to form line 225. This offset and angle deviation compensates for the forces exerted by the vertical component of the earth's magnetic field as illustrated in Figs. 18 to 22 inclusive. An angle betal ($\beta$) is added to line 225 so that the axis 227 of lens 221 will be defined to account for the effects of dynamic convergence as explained in conjunction with Figs. 24 to 28 inclusive. The axis light rod 223 is tilted at an angle rho sub one ($\rho_1$), from axis 227 to provide for substantially equal attenuation of light over the entire screen surface as explained in conjunction with Fig. 23.

When forming the fluorescent configurations in accordance with beam 211, the optical system is moved to its successive position as indicated on the right side of Fig. 29. Here again, the optical system is offset a distance Y and tilted at an angle alpha ($\alpha$) in the same manner as has been previously described to define line 229, since the vertical component of the earth's field is in the same transverse direction and at substantially the same magnitude for each of the beams employed in the tube.

The axis 231 of lens 221 is then located an angle beta ($\beta$) away from line 229 to provide compensation for the effects of dynamic convergence. Since the locus of the apparent motion of the center of deflection in this instance is in a different direction for each beam as shown in Fig. 27, this angle beta ($\beta$) must be subtracted from angle alpha ($\alpha$) to afford the correct total compensation for this beam. The axis of light rod 223 is then rotated from lens axis 231 an angle rho sub 2 ($\rho_2$) to provide the proper light attenuation over the entire screen area.

Viewing screens for color picture tubes constructed with the above described optical system and in accordance with the illustrated methods make possible the fabrication of screens capable of reproducing images having color purity characteristics not heretofore attainable.

Although several embodiments of the invention have been shown and described, it will be apparent to those skilled in the art that various changes and modifications may be made therein without departing from the scope of the invention as defined by the appended claims.

What is claimed is:

1. In an exposure device adapted for use in processing discrete screen patterns for cathode ray tubes of the post-acceleration deflection type wherein the electron beam path is altered intermediate the deflection region and the screen by an electron lens having a given deflection characteristic, the position of the electron beam in the deflection region having a defined space relationship to the beam impinging position on the screen at a given deflection angle, an optical system comprising a photographic plate, a light transmitter formed to radiate light rays from a point source positioned relative to said plate substantially in said defined space relationship, an optical lens having a refractive characteristic substantially equivalent to the deflection characteristic of said electron lens disposed intermediate the transmitter and said plate, and an apertured grid positioned between said transmitter and said optical lens formed to mask prescribed portions of said plate from the light rays.

2. In an exposure device adapted for use in processing discrete screen patterns for cathode ray tubes of the post-acceleration deflection type wherein the electron beam path is altered intermediate the deflection region and the screen by an electron lens having a given deflection characteristic, the position of the electron beam in the deflection region having a defined space relationship to the beam impinging position on the screen at a given deflection angle, an optical system comprising a photographic plate, a light transmitter formed to radiate light rays from a point source positioned relative to said plate substantially in said defined space relationship, a plano-convex optical lens having a refractive characteristic substantially equivalent to the deflection characteristic of said electron lens disposed intermediate the transmitter and said plate, and an apertured grid positioned between said transmitter and said optical lens formed to mask prescribed portions of said plate from the light rays.

References Cited in the file of this patent

UNITED STATES PATENTS

| | | |
|---|---|---|
| 1,245,606 | MacCurdy | Nov. 6, 1917 |
| 2,446,915 | Filmer | Aug. 10, 1948 |
| 2,548,565 | Staehle | Apr. 10, 1951 |
| 2,601,196 | Willis | June 17, 1952 |
| 2,625,734 | Law | Jan. 20, 1953 |
| 2,733,366 | Grimm et al. | Jan. 31, 1956 |
| 2,817,276 | Epstein et al. | Dec. 24, 1957 |

OTHER REFERENCES

R. B. Janes, L. B. Headrick, and J. Evans: Recent Improvements in the 21 AXP 22 Color Kinescope, June 1956 (reprinted from RCA Review, vol. XVII, No. 2), pages 1–167, Publication No. ST–1019, Tube Division RCA, Lancaster, Penn.